(12) United States Patent
Raveloson et al.

(10) Patent No.: US 11,066,928 B2
(45) Date of Patent: Jul. 20, 2021

(54) DOWNHOLE DATA TRANSMISSION AND SURFACE SYNCHRONIZATION

(71) Applicant: Schlumberger Technology Corporation, Sugar Land, TX (US)

(72) Inventors: Nirina David Raveloson, Sugar Land, TX (US); Alex David Close, Cheltenham (GB); Nikhil Kotian, Kingsdown (GB); William James Robert Thomson, Stonehouse (GB); Prince Mathew Samuel, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 460 days.

(21) Appl. No.: 16/067,842

(22) PCT Filed: Jun. 18, 2018

(86) PCT No.: PCT/US2018/037975
§ 371 (c)(1),
(2) Date: Jul. 3, 2018

(87) PCT Pub. No.: WO2018/236696
PCT Pub. Date: Dec. 27, 2018

(65) Prior Publication Data
US 2020/0049001 A1    Feb. 13, 2020

Related U.S. Application Data

(60) Provisional application No. 62/522,740, filed on Jun. 21, 2017.

(51) Int. Cl.
*E21B 47/12* (2012.01)
*E21B 47/00* (2012.01)
*E21B 49/00* (2006.01)

(52) U.S. Cl.
CPC .............. *E21B 47/12* (2013.01); *E21B 47/00* (2013.01); *E21B 49/00* (2013.01)

(58) Field of Classification Search
None
See application file for complete search history.

(56) References Cited

U.S. PATENT DOCUMENTS 3,991,611 A    11/1976  Marshall, III et al.
7,348,893 B2    3/2008  Huang et al.
(Continued)

FOREIGN PATENT DOCUMENTS

EP          0349465 A3      1/1990
WO       2016200766 A1    12/2016

OTHER PUBLICATIONS

International Search Report and Written Opinion issued in International Patent application PCT/2018/037975 dated Sep. 21, 2018, 9 pages.
(Continued)

*Primary Examiner* — Kristyn A Hall (57) ABSTRACT

A telemetry method transmits data from a downhole location to a surface location. During transmission an event is detected that makes it desirable to change a transmitted data stream. A downhole processor processes the detected event in combination with a predefined event database and downhole measurement data using a frame building algorithm to compute a digital data stream. Synchronization markers are added to the data stream to obtain a synchronized data stream in which the synchronization markers identify the detected event. The synchronized data stream is transmitted to the surface location using a downhole telemetry tool and received at the surface location to obtain a decoded data stream. A surface processor processes the synchronization markers to identify the detected event and further processes the detected event in combination with a predefined event
(Continued)

database and the decoded data stream using the frame building algorithm to obtain the downhole measurements.

15 Claims, 5 Drawing Sheets

(56) References Cited

U.S. PATENT DOCUMENTS

| | | |
|---|---|---|
| 7,657,672 B2 | 2/2010 | Kampmann et al. |
| 7,843,959 B2 | 11/2010 | Kampmann et al. |
| 8,000,350 B2 | 8/2011 | Riedel et al. |
| 8,044,821 B2 | 10/2011 | Mehta |
| 2007/0057811 A1 | 3/2007 | Mehta |
| 2007/0189119 A1* | 8/2007 | Klotz .................. E21B 47/18 367/83 |
| 2014/0085098 A1 | 3/2014 | Stolpman et al. |
| 2014/0129148 A1 | 5/2014 | Harmer et al. |
| 2015/0078625 A1 | 3/2015 | Yu et al. |
| 2018/0119546 A1* | 5/2018 | Soos .................. E21B 47/13 |

OTHER PUBLICATIONS

Extended European Search Report under Rule 62 EPC in European Patent Application No. 18821217.9, dated Jun. 14, 2021, 6 pages.

\* cited by examiner

DOWNHOLE DATA TRANSMISSION AND SURFACE SYNCHRONIZATION

CROSS REFERENCE TO RELATED APPLICATIONS

This application claims the benefit of and priority to U.S. Provisional Application No. 62/522,740, filed on Jun. 21, 2017, the entirety of which is incorporated herein by reference.

BACKGROUND

Oil and gas well drilling operations commonly employ a number of measurement while drilling (MWD) and logging while drilling (LWD) techniques to gather information about the borehole and the formation through which it is drilled. MWD and LWD techniques may be used, for example, to obtain information about the well (e.g., information about the size, shape, and direction thereof) and the surrounding formation (e.g., the acoustic velocity, density, and resistivity thereof).

Transmission of data (e.g., MWD and LWD data) from a downhole tool to the surface is a difficult process common to many drilling operations. Various telemetry techniques may be employed, for example, including mud pulse telemetry, electromagnetic telemetry, and acoustic telemetry. Owing in part to the inherently noisy communication channel, downhole telemetry operations tend be error prone and slow (having a very limited bandwidth). In view of these difficulties, conventional telemetry operations commonly transmit preconfigured sequences of data.

Modern drilling tools generate a large quantity of sensor data that can overload the telemetry channel. Selecting the appropriate information to transmit may involve evaluating complex relationships and dependencies between the various data sets, the drilling conditions, and the subterranean formations.

SUMMARY

Embodiments of the present application include a telemetry method for transmitting data from a downhole location to a surface location. An event is detected that makes it desirable to change a transmitted data stream while drilling. A downhole processor processes the detected event in combination with a predefined event database and downhole measurement data using a frame building algorithm to compute a digital data stream. Synchronization markers are added to the data stream to obtain a synchronized data stream in which the synchronization markers identify the detected event. The synchronized data stream is transmitted to the surface location using a downhole telemetry tool and received at the surface location to obtain a decoded data stream. A surface processor processes the synchronization markers to identify the detected event and further processes the detected event in combination with a predefined event database and the decoded data stream using the frame building algorithm to obtain the downhole measurements.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Embodiments of the present application relate generally to telemetry methods in downhole drilling operations and more particularly to a method for synchronizing downhole and surface operations during a telemetry operation. Some embodiments of the present application provide for more reliable transmission of downhole data to the surface. Embodiments of the present application enable the transmitted data stream and content to be automatically modified on the fly (while drilling) in response to a detected downhole event.

Figure 1:
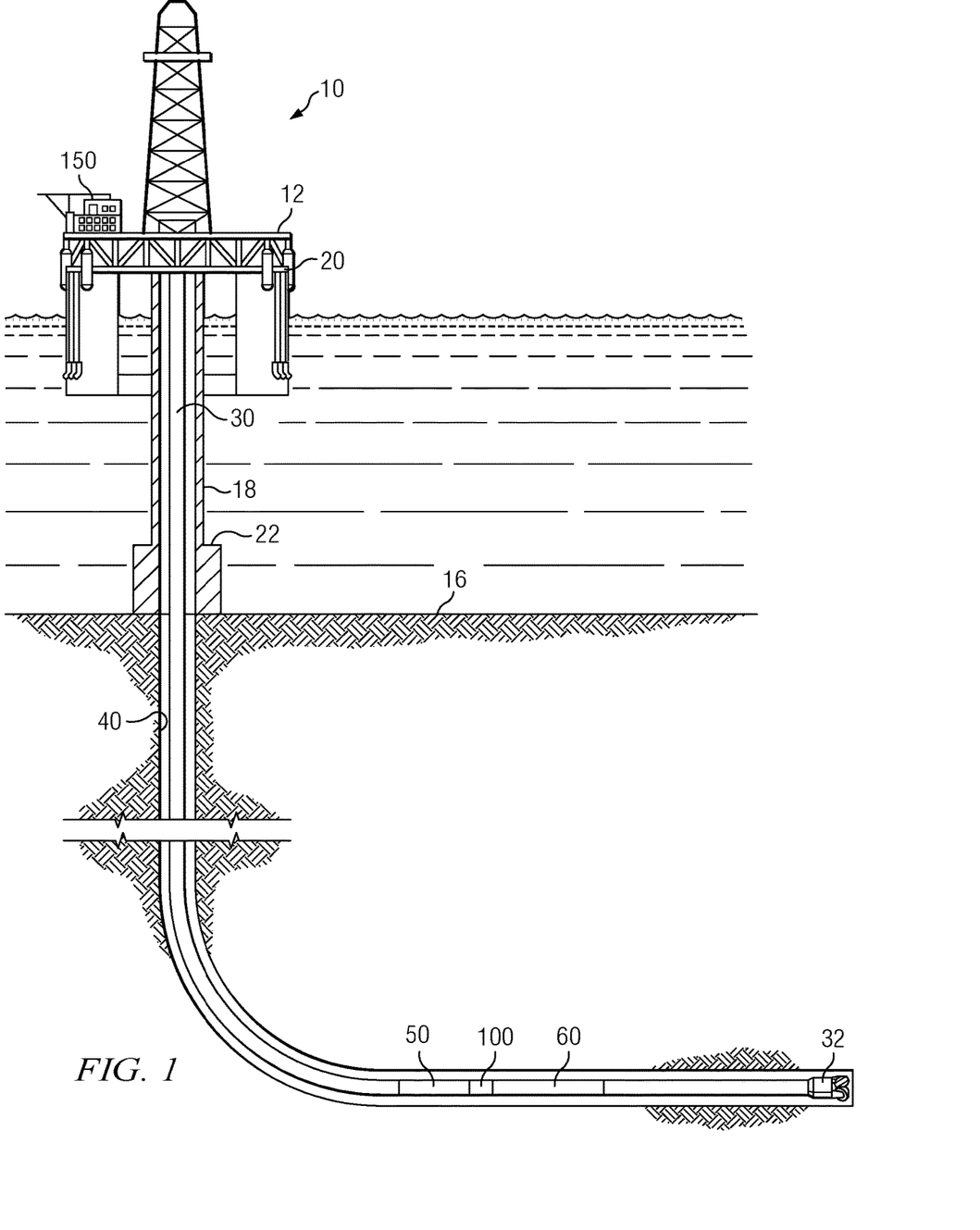
FIG. 1 depicts a drilling rig on which the disclosed system and method embodiments may be utilized.

FIG. 1 depicts an example offshore drilling assembly, generally denoted 10, suitable for employing the disclosed system and method embodiments. In FIG. 1 a semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32, a transmission device 50, and at least one MWD/LWD tool 60. Drill string 30 may optionally further include any number of other tools including, for example, other MWD/LWD tools, stabilizers, a rotary steerable tool, and/or a downhole drilling motor.

FIG. 1 further depicts downhole and surface control systems 100 and 150. The downhole system 100 is deployed in the drill string, for example, in proximity to the transmission device 50 and the MWD/LWD tool 60. The downhole system 100 may include substantially any suitable downhole controller, for example, including a programmable processor (such as a microprocessor or a microcontroller) and electronic memory. The downhole controller may also include processor-readable or computer-readable program code embodying logic, including instructions for controlling the function of the transmission device 50. The surface control system 150 may be deployed, for example, on the drilling rig and may include substantially any suitable processing device, such as a personal computer. It will be understood that the disclosed embodiments are explicitly not limited to any particular downhole and surface systems.

With continued reference to FIG. 1, the transmission device 50 may include substantially any suitable downhole telemetry device. For example, the telemetry device 50 may include an electromechanical pulser or a mud siren suitable for mud pulse telemetry, an electromagnetic wave generator suitable for electromagnetic telemetry, or an acoustic generator suitable for acoustic telemetry, or the like. Those of ordinary skill will readily appreciate that in mud pulse telemetry operations, data is transmitted to the surface via pressure waves and/or pulses in the drilling fluid. In electromagnetic telemetry operations, data is transmitted to the surface via a low frequency electromagnetic wave that propagates through the earth formations. In acoustic telemetry operations, data is transmitted to the surface via an acoustic signal that propagates through the drill string. The disclosed embodiments are not limited in these regards and any suitable telemetry system may be used.

The MWD/LWD tool 60 may include any downhole logging while drilling sensor, for example, including a natural gamma ray sensor, a neutron sensor, a density sensor, a resistivity sensor, a formation pressure sensor, an annular pressure sensor, an ultrasonic sensor, an audio-frequency acoustic sensor, and the like. Such sensors are used to make a wide range of downhole logging measurements. The tool 60 may alternatively and/or additionally include various directional sensors such as accelerometers, magnetometers, and/or gyroscopic sensors. The tool 60 may further optionally include an energy source, such as a motor, generator, battery, or the like. For example, an LWD tool configured for azimuthal gamma measurements may include a gamma radiation source (such a device is commonly referred to as a density measurement tool). Likewise, LWD tools configured for azimuthal resistivity and acoustic velocity measurements may include one or more electromagnetic wave generators and acoustic transmitters, respectively. The disclosed embodiments are not limited in any of these regards.

It will be understood by those of ordinary skill in the art that the deployment illustrated on FIG. 1 is an example. It will be further understood that the disclosed embodiments are not limited to use with a semisubmersible platform 12 as illustrated on FIG. 1. The disclosed embodiments are equally well suited for use with any kind of subterranean drilling operation, either offshore or onshore.

In disclosed embodiments, the downhole and surface systems 100 and 150 run a common algorithm; the downhole system 100 generating a continuous stream of digitized data for transmission to the surface (via transmission device 50) and the surface system 150 generating a hypothetical stream of data having a substantially identical structure to the digitized stream generated by the downhole system 100. The common algorithm is referred to herein as a frame building algorithm. Running the frame building algorithm with identical initial conditions at both the downhole and surface systems 100 and 150 enables the surface system 150 to anticipate the digitized data stream received from the downhole system 100 and the transmission device 50. The data stream may include synchronization information (such as extra bits) to enable the surface system 150 to identify a data portion of the stream (e.g., the transmitted measurement data) even in the event of synchronization corruption.

Figure 2:
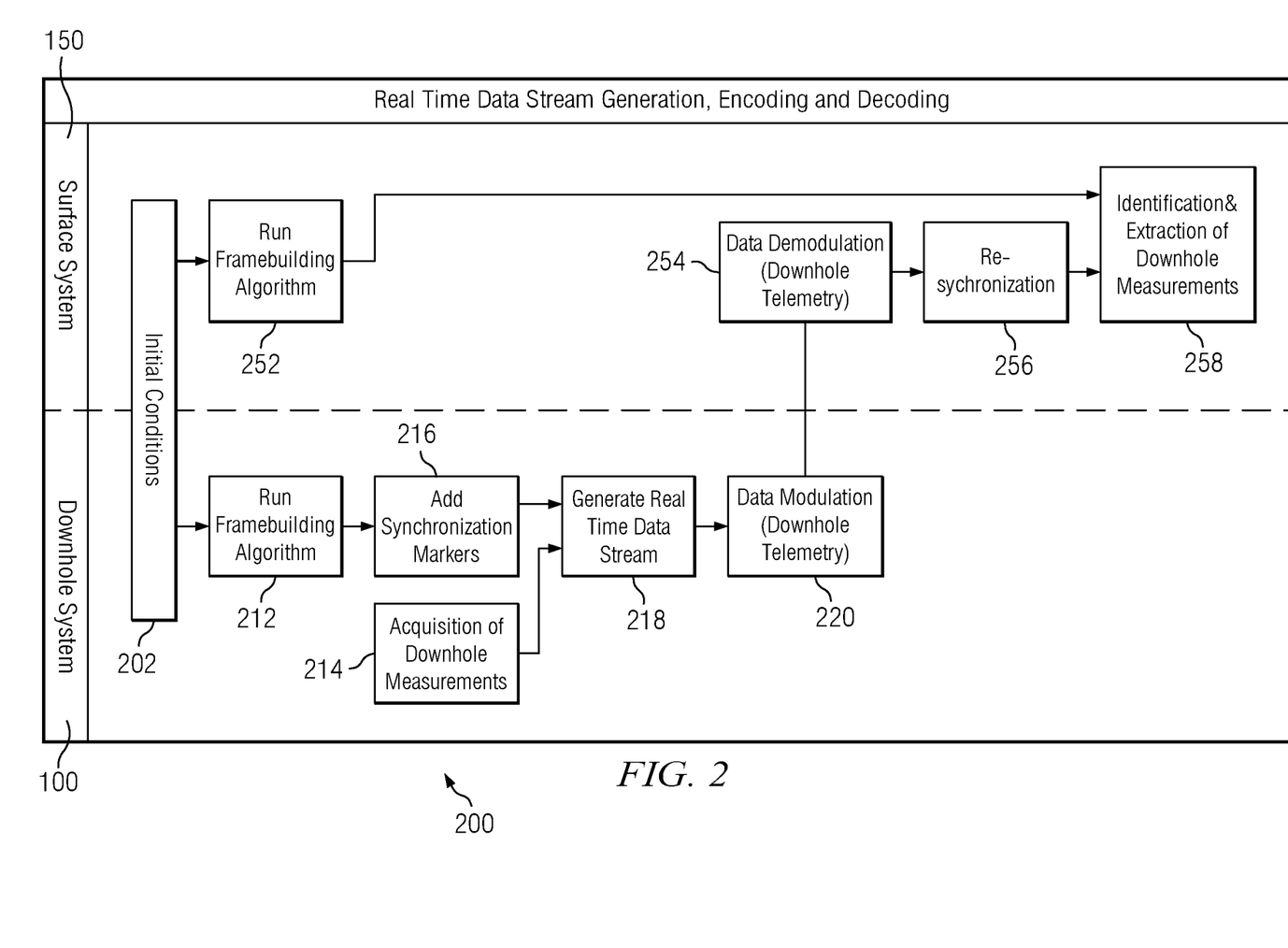
FIG. 2 depicts a flow chart of one disclosed telemetry method embodiment for transmitting data from a downhole location to a surface location.

FIG. 2 depicts a flow chart of one depicted telemetry method embodiment 200 for transmitting data from a downhole location such as a drill string to a surface location. In the depicted embodiment, the downhole and surface systems 100 and 150 are configured to run a frame building algorithm as described above using identical initial conditions 202. The initial conditions may be established (e.g., programmed in the downhole system memory) before the initiation of a drilling job (e.g., when the drilling system is at the surface). The downhole system 100 runs the frame building algorithm at 212 based on the pre-established initial conditions 202. Downhole measurements (e.g., measurements made by MWD/LWD tool 60) are acquired at 214 and combined with synchronization markers 216 to generate a real-time (while drilling) data stream at 218. The generated data stream is then transmitted to the surface at 220. The surface system 150 runs the frame building algorithm at 252 based on the pre-established initial conditions 202. The transmitted data stream is received at 254 and resynchronized at 256 to identify and extract the downhole measurements at 258.

During a drilling operation it may be necessary to modify the transmitted data stream. For example, a sensor failure may necessitate a change in the transmitted data content. Likewise, it may be desirable to change the transmitted data content due to various formation specific events or drilling specific events. For example, additional measurements may be acquired upon penetrating a predetermined formation or due to changing drilling conditions such as the onset of stick slip, vibrations, or other dynamic drilling conditions. Additionally, measurement frequency may increase or decrease with changes in drilling speed. A change in telemetry data rate (bit rate) may also necessitate a modification to the transmitted data stream. The disclosed embodiments are, of course, not limited to these particular events.

Figure 3:
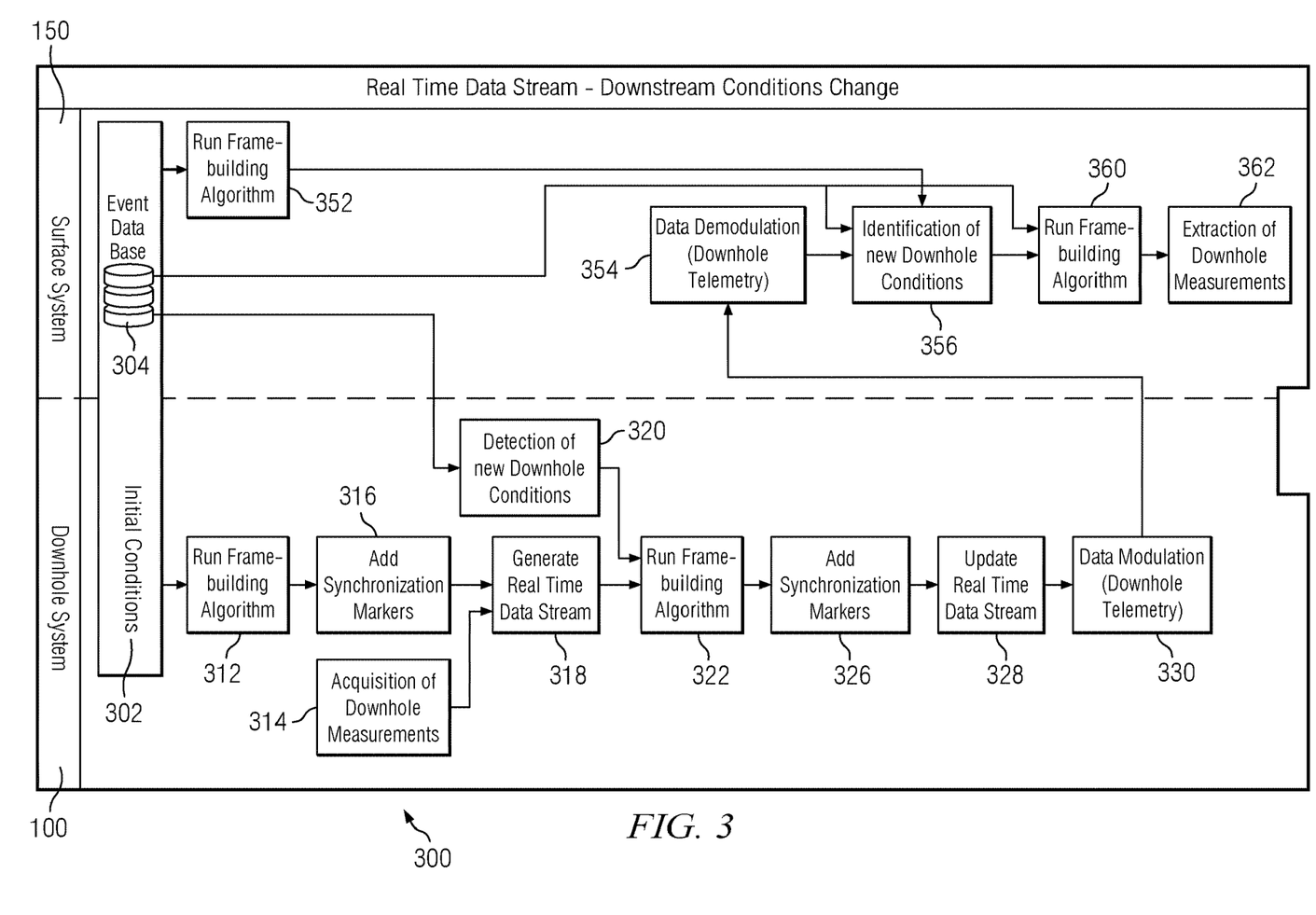
FIG. 3 depicts another disclosed telemetry method embodiment.

Identification of one more conditions requiring data stream modification may be accommodated, for example as depicted on FIG. 3 which depicts a flow chart of another embodiment 300. As in FIG. 2, the downhole and surface systems 100 and 150 are configured to run a frame building algorithm. The initial conditions 302 include an events database 304 including a number of possible events that would make it desirable to make a data stream modification (e.g., events that would require a data stream modification). Embodiment 300 is similar to embodiment 200 in that the downhole system 100 runs the frame building algorithm at 312 based on the pre-established initial conditions 302. Downhole measurements (e.g., measurements made by MWD/LWD tool 60) are acquired at 314 and combined with synchronization markers 316 to generate a real-time (while drilling) data stream at 318. One or more events requiring data stream modification may be detected at 320. As described above, such events may include, for example, penetration of a predetermined formation or formations, changing drilling conditions, or a downlinked request from the surface system 150. Event detection at 320 triggers a change in the initial conditions based upon conditions established in the event database.

Upon detecting the event(s) at 320, the downhole system 100 re-runs the frame building algorithm at 322 based on the new initial conditions (from the events database). Synchronization markers 326 may be added to update the real-time data stream at 328. The updated data stream may then be transmitted to the surface system at 330.

With continued reference to FIG. 3, the surface system 150 runs the frame building algorithm at 352 based on the pre-established initial conditions 302. The transmitted data stream is received at 354 and evaluated at 356 to identify the synchronization markers added at 326 to identify the new initial conditions (from the event data base 304). The surface system 150 then re-runs the frame building algorithm at 360 based on the new initial conditions to extract the downhole measurements at 362.

Figure 4:
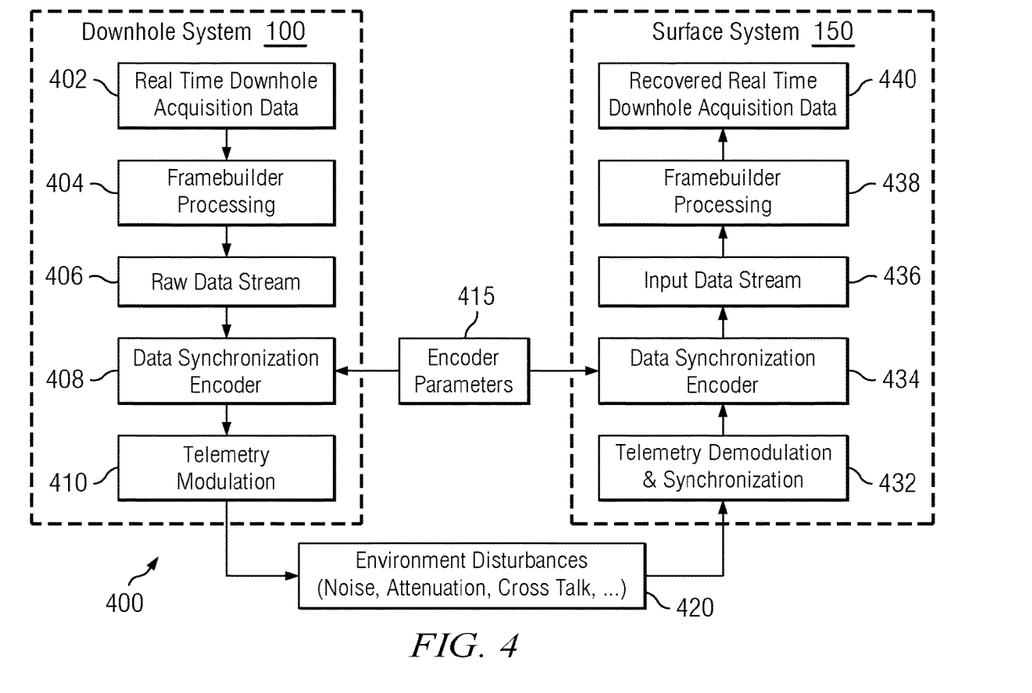
FIG. 4 depicts a telemetry method embodiment similar to the embodiment depicted on FIG. 2.

FIG. 4 depicts a flow chart of an embodiment 400 similar to embodiment 200. Sensor data is acquired while drilling at 402 by downhole system 100 and processed using a frame building algorithm at 404 to generate a raw data stream at 406. The raw data stream is processed using a synchronization encoder to generate a synchronized data stream (e.g., a digitized data stream including synchronization bits) at 408 using predetermined encoder parameters 415. The synchronized data stream is transmitted to the surface at 410 using a downhole telemetry system (e.g., transmission device 50). As is known to those of ordinary skill in the art, such transmission may result in data loss or attenuation due to environmental disturbances such as noise, attenuation, cross talk, etc. depicted schematically at 420. The transmitted signal is received at 432 at the surface system 150 and processed via a data synchronization decoder at 434 using encoder parameters 415 (the same parameters used to synchronize the data stream in the downhole system) to obtain an input (received) data stream at 436. The input data stream is then processed at 438 using the frame building algorithm to obtain the reconstructed downhole measurements at 440.

The example embodiment depicted on FIG. 4 illustrates how the downhole system 100 may generate the digitized data stream including synchronization markers/bits and how the surface system 150 may then rebuild the original data structure to extract the measurements. The method adds timing and context information to the data (via the synchronization bits) such that the surface system 150 can deduce the nature of the transmitted data even when information is missing or distorted (e.g., due to environmental factors depicted at 420). The synchronization information may include, for example, two components that are repeated at a predefined period known to both the downhole 100 and surface 150 systems; (i) synchronization information and (ii) optional data stream context information.

As is known to those of ordinary skill in the art, the communications channel 420 can introduce data stream errors (e.g., due to noise and/or signal attenuation). These errors may in turn cause desynchronization and subsequent data loss. Repeating the synchronization bits (the synchronization information) at a known period enables the surface system 150 periodically validate the synchronization of the received data stream. It will be understood that the choice of synchronization bits (or the bit pattern) may be selected based on the characteristics of the telemetry methodology. For example, the synchronization bits may be selected to maximize the Hamming distance between synchronization patterns and to provide a suitable balance of the telemetry symbol choice to maximize the success rate of data recovery.

It will be further understood that synchronization encoding (including synchronization bits in the data stream as described herein) tends to degrade the data transmission efficiency (by adding extra bits to the data in the bit stream). In some embodiments, the synchronization bits and the synchronization period may be further optimized so as to balance stability and transmission overhead requirements.

The optional data stream context information is intended to uniquely identify the data order in the data stream generated by the frame building algorithm. The context information may further indicate changes to the data stream, for example, due to an event that requires a change in the data stream (e.g., an event that makes it desirable to make a change in the data stream). The context information may also be repeated periodically in the data stream to ensure successful detection.

Figure 5:
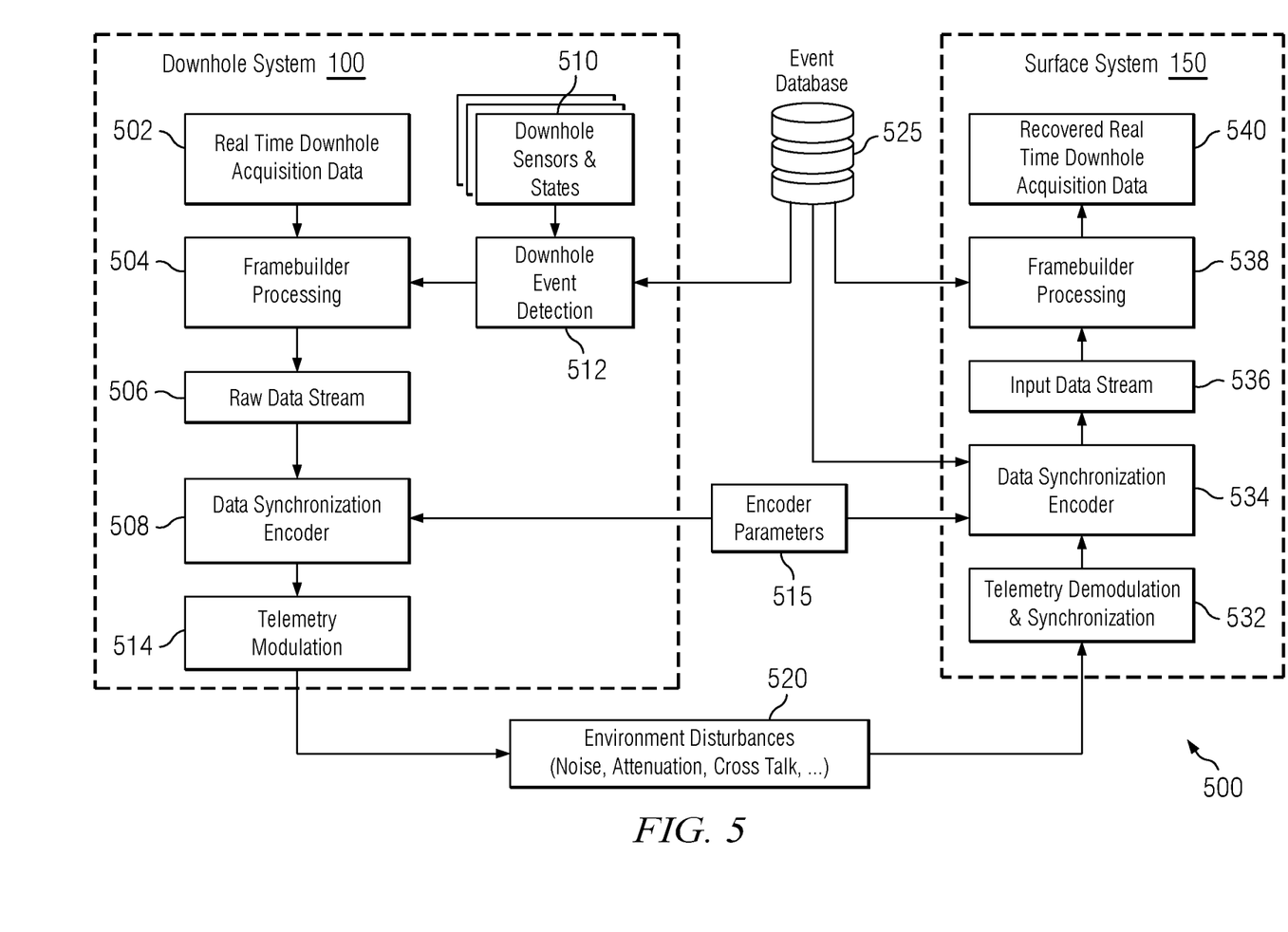
FIG. 5 depicts a telemetry method embodiment similar to the embodiment depicted on FIG. 5.

FIG. 5 depicts a flow chart of an embodiment 500 similar to embodiment 300. Sensor data is acquired while drilling at 502 by downhole system 100 and processed using a frame building algorithm at 504 to generate a raw data stream at 506. The raw data stream is processed using a synchronization encoder to generate a synchronized data stream (e.g., a digitized data stream including synchronization bits) at 508 using predetermined encoder parameters 515. Downhole sensors and/or a processor configured to determine the drilling state and/or the rig state may be used at 510 to detect one or more events requiring data stream modification at 512 (e.g., as described above). A suitable drilling state processor is disclosed in U.S. Patent Publication 2014/0129148 (which is herein incorporated by reference in its entirety).

Upon detecting the event(s) at 512, new initial conditions from an events database 525 may be input into the frame building algorithm and the synchronization encoder such that data received at 502 is processed with the new initial conditions to obtain a synchronized data stream. This data stream may then be transmitted to the surface at 514 using the downhole telemetry system. As is known to those of ordinary skill in the art, such transmission may result in data loss or attenuation due to environmental disturbances such as noise, attenuation, cross talk, etc. depicted schematically at 520. The transmitted signal is received at 532 at the surface system 150 and processed via a data synchronization decoder at 534 using encoder parameters 515 and the new initial conditions from the events database 525 (the same parameters used to synchronize the data stream in the downhole system) to obtain an input (received) data stream at 536. The input data stream is then processed at 538 using the frame building algorithm to obtain the reconstructed downhole measurements at 540.

With continued reference to FIGS. 2-5, the frame building algorithm may be programmed with substantially any suitable initial conditions (which may also be referred to as input parameters). The initial conditions may include, for example, the make-up of the bottom hole assembly (BHA), including the number and order of tools and sensors deployed in the BHA. The initial conditions may further include the telemetry bit rate (transmission rate) as well as the rate (or range of rates) of penetration of drilling. The rate of penetration may be predefined, computed downhole, or received from the surface via downlink. The initial conditions may also include a listing (or set) of priority measurements (e.g., mission critical measurements) to be transmitted by the BHA to the surface at a predetermined or computed vertical resolution.

It will be understood that the nature of the priority measurements (e.g., mission critical measurements) or the architecture of the BHA may impose restrictions (constraints) on the format of the digital data stream generated by the frame building algorithm. These restrictions may include, for example, but are not limited to the following constraints: (i) certain measurements may be dependent on other measurements such that inclusion of one in the data stream necessitates inclusion of the other(s); (ii) certain measurements may be incompatible with other measurements such that inclusion of one necessitates exclusion of the other(s); (iii) a certain sequence may be desired (or required) between various measurements; and (iv) various minimum or maximum spacing may be desired (or required) between various measurements.

In conventional drilling operations the above described constraints are resolved by a drilling operator at the surface and therefore cannot be implemented automatically downhole. In contrast to conventional drilling operations, certain disclosed embodiments provide a method for automatically resolving the constraints using a downhole processor. The above described constraints may be represented as rules, for example, (i) add, (ii) delete, (iii) reshuffle, and (iv) check rules.

The add and delete rules ensure that the above described measurement dependencies are met, for example, by adding or deleting measurements to or from the measurement sequence. These rules are intended to enforce the first and second constraints listed above. The reshuffle rule is intended to enforce the third and fourth constraints by reshuffling the measurement sequence to create a certain sequence and/or to meet any constraints that dictate specific spacing between measurements. The check rule is intended to ensure that the reshuffle rule has not broken the add or delete rule.

Figures 6, 7:
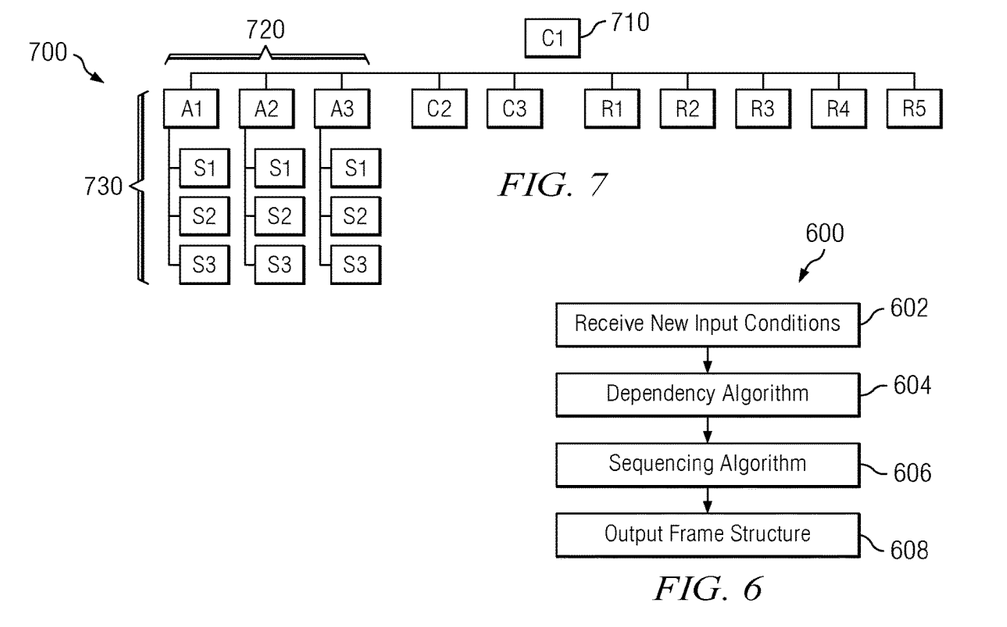
FIG. 6 depicts a flow chart of one example method used to modify a data stream.
FIG. 7 depicts one example frame builder tree for executing the method of FIG. 6.

FIG. 6 depicts a flow chart of one example of a method 600 used to modify a data stream, for example, upon identifying a predetermined trigger event. Method 600 may thus be used to update the frame building algorithm based upon new initial conditions in the event database. The new input conditions are received at 602, for example, in the form of an initial list of downhole measurements to be transmitted to the surface. These measurements may be processed downhole using a dependency algorithm 604, for example, including the above described add and delete rules to determine a final list of measurements for transmission to the surface. The final list of measurements may then be further processed downhole using a sequencing algorithm 606, for example, including the above described reshuffle and check rules to establish the order and spacing between the measurements and to determine the frame structure at 608.

It will be understood that method 600 may further be depicted as an example frame builder tree. FIG. 7 depicts one such example frame builder tree 700. Tree 700 may begin with an initial check 710 (C1) to ensure that the correct initial conditions are received and used to determine the appropriate frame structure. After the initial check, the frame builder tree 700 may be executed from left to right. The depicted embodiment continues with an add/subtract sequence 720, which may be thought of as being analogous to the dependency algorithm 604 described above with respect to FIG. 6. The depicted add/subtract sequence 720 includes an add/subtract routine 730 for each measurement tool in the bottom hole assembly (or correspondingly for each measurement). For example, the leftmost (first) add/subtract routine 720 includes add rule A1 followed by subtract rules S1, S2, and S3. The second and third add/subtract routines include corresponding add rules A2 and A3, each of which is also followed by subtract rules S1, S2, and S3. Tree 700 may then continue with check rules C1 and C2 and reshuffle rules R1, R2, R3, R4, and R5, which are intended to establish the order and spacing between the measurements. The check rules and reshuffle rules may thus be understood to be analogous to sequencing algorithm 606 described above with respect to FIG. 6.

Although a system and method for downhole data transmission and surface synchronization has been described in detail, it should be understood that various changes, substitutions and alternations can be made herein without departing from the spirit and scope of the disclosure as defined by the appended claims.

The invention claimed is:

1. A telemetry method for transmitting data from a downhole location to a surface location, the method comprising:
   (a) detecting a downhole event that requires change to a transmitted data stream;
   (b) causing a downhole processor to process the downhole event detected in (a) in combination with a predefined event database and downhole measurement data using a frame building algorithm to compute a digital data stream;
   (c) adding synchronization markers to the data stream computed in (b) to obtain a synchronized data stream, the synchronization markers identifying the downhole event detected in (a);
   (d) transmitting the synchronized data stream to the surface location using a downhole telemetry tool;
   (e) receiving the synchronized data stream at the surface location and processing the received synchronized data stream with a decoder to obtain a decoded data stream;
   (f) causing a surface processor to process the synchronization markers to identify the downhole event detected in (a); and
   (g) causing the surface processor to process the event detected in (a) in combination with the predefined event database and the decoded data stream using the frame building algorithm processed in (b) to obtain the downhole measurements.

2. The method of claim 1, wherein the event detected in (a) comprises at least one of the following: (i) receiving a command from the surface location, (ii) penetration of a predetermined formation or formations while drilling, (iii) changing drilling conditions, or (iv) a change in telemetry data rate.

3. The method of claim 1, wherein (b) further comprises:
   (i) receiving new input conditions from the predefined event database based on the event detected in (a);
   (ii) processing the new input conditions using a dependency checking algorithm to determine a final list of downhole measurements to be transmitted in (d); and
   (iii) processing the final list of measurements using a sequencing algorithm to compute a frame structure for the digital data stream.

4. The method of claim 3, wherein the dependency checking algorithm employs add rules and subtract rules, wherein the add rules add downhole measurements to the final list of downhole measurements and the subtract rules subtract downhole measurements from the final list of downhole measurements.

5. The method of claim 3, wherein the sequencing algorithm employs reshuffle rules that reorder the downhole measurements to achieve a predetermined spacing and order of the downhole measurements in the final list of downhole measurements.

6. The method of claim 1, wherein the downhole telemetry tool comprises a mud pulse telemetry tool, an electromagnetic telemetry tool, or an acoustic telemetry tool.

7. The method of claim 1, wherein (f) further comprises causing the surface processor to process the synchronization markers in combination with the predefined event database to identify the downhole event detected in (a).

8. The method of claim 1, wherein adding synchronization markers includes using one or more encoder parameters, and wherein processing the received synchronized data stream with the decoder includes using a data synchronization decoder and the one or more encoder parameters.

9. A telemetry method for transmitting data from a downhole location to a surface location, the method comprising:
   (a) acquiring downhole measurements while drilling a subterranean well;
   (b) causing a downhole processor to process the downhole measurements using a frame building algorithm to compute a digital data stream for transmission to the surface;
   (c) detecting a downhole event that requires a change to the digital data stream;
   (d) causing the downhole processor to process the downhole event detected in (c) in combination with a predefined event database to modify the frame building algorithm;

(e) causing the downhole processor to process the downhole measurements using the frame building algorithm modified in (d) to compute a modified digital data stream;

(f) adding synchronization markers to the modified data stream computed in (e) to obtain a synchronized data stream, the synchronization markers identifying the downhole event detected in (c);

(g) transmitting the synchronized data stream to the surface location using a downhole telemetry tool;

(h) receiving the synchronized data stream at the surface location and processing the received synchronized data stream with a decoder to obtain a decoded data stream;

(i) causing a surface processor to process the synchronization markers to identify the downhole event detected in (c);

(j) causing the surface processor to process the event detected in (c) in combination with the predefined event database to modify the frame building algorithm; and (k) causing the surface processor to process the decoded data stream using the frame building algorithm modified in (j) to obtain the downhole measurements.

10. The method of claim 9, wherein the event detected in (c) comprises at least one of the following: (i) receiving a command from the surface location, (ii) penetration of a predetermined formation or formations while drilling, (iii) changing drilling conditions, or (iv) a change in telemetry data rate.

11. The method of claim 9, wherein (d) further comprises:
(i) receiving new input conditions from the predefined event database based on the event detected in (c);
(ii) processing the new input conditions using a dependency checking algorithm to determine a final list of downhole measurements to be transmitted in (g); and
(iii) processing the final list of measurements using a sequencing algorithm to compute a frame structure for the digital data stream.

12. The method of claim 11, wherein the dependency checking algorithm employs add rules and subtract rules, wherein the add rules add downhole measurements to the final list of downhole measurements and the subtract rules subtract downhole measurements from the final list of downhole measurements.

13. The method of claim 11, wherein the sequencing algorithm employs reshuffle rules that reorder the downhole measurements to achieve a predetermined spacing and order of the downhole measurements in the final list of downhole measurements.

14. The method of claim 9, wherein the downhole telemetry tool comprises a mud pulse telemetry tool, an electromagnetic telemetry tool, or an acoustic telemetry tool.

15. The method of claim 9, wherein (i) further comprises causing the surface processor to process the synchronization markers in combination with the predefined event database to identify the downhole event detected in (c).

* * * * *